J. W. ROGERS.
Churn.
No. 214,457. Patented April 15, 1879.
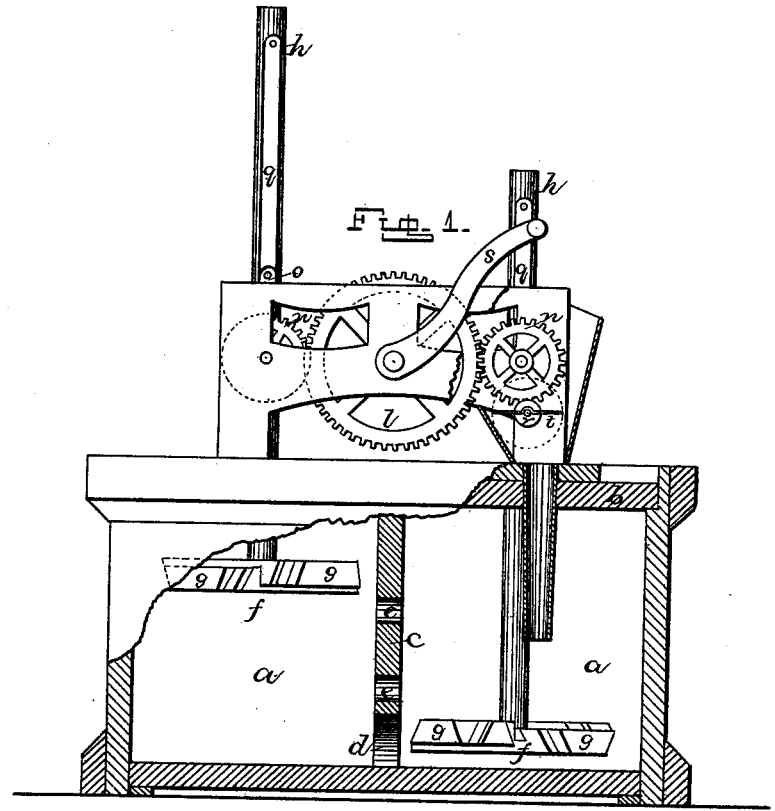
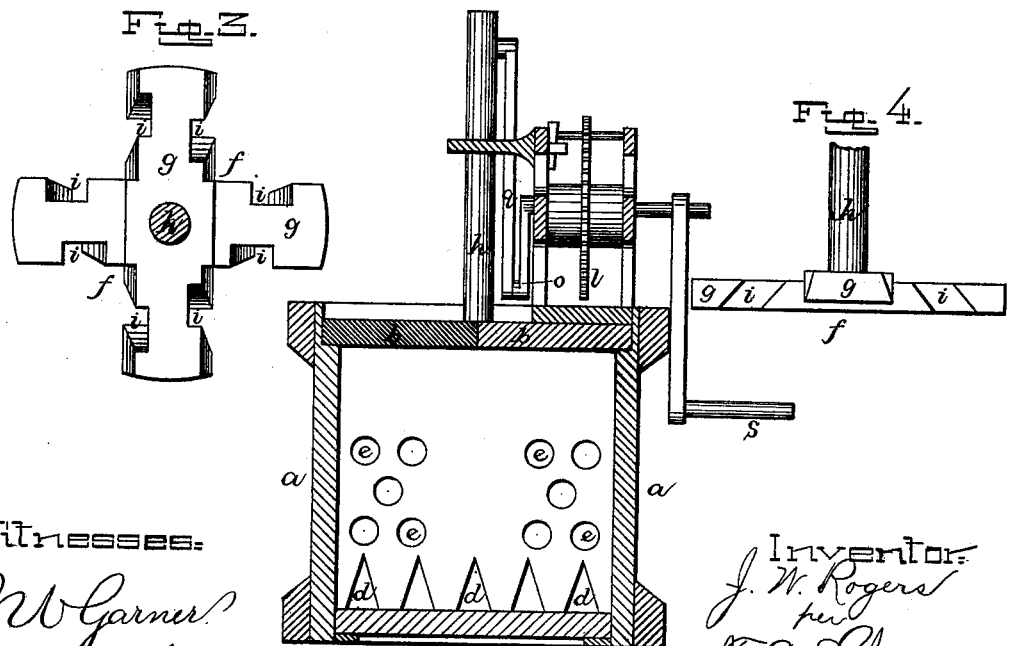
Witnesses:
J. W. Garner
W. S. D. Haines
Inventor:
J. W. Rogers
per
F. A. Lehmann,
atty

UNITED STATES PATENT OFFICE.

JONATHAN W. ROGERS, OF MOUNT STERLING, IOWA.

IMPROVEMENT IN CHURNS.

Specification forming part of Letters Patent No. 214,457, dated April 15, 1879; application filed September 18, 1878.

*To all whom it may concern:*

Be it known that I, JONATHAN W. ROGERS, of Mount Sterling, in the county of Van Buren and State of Iowa, have invented certain new and useful Improvements in Churns; and I do hereby declare the following to be a full, clear, and exact description of the invention, such as will enable others skilled in the art to which it pertains to make and use it, reference being had to the accompanying drawing, which forms part of this specification.

My invention relates to an improvement in churns; and it consists in the construction of the operating mechanism, and in the construction and combination of parts, as will be hereinafter more fully set forth.

The accompanying drawing represents my invention.

$a$ represents a suitably-shaped box or churn, provided with a cover, $b$, and having the partition $c$ in its center. Through the lower edge of this partition are made a number of triangular or other suitably-shaped holes, $d$, and above the lower edge are made a number of other holes, $e$, and through these holes $d$ and $e$ the cream is forced as the dashers $f$ are worked up and down on each side of the partition.

Each dasher is composed of two or more pieces, $g$, which are rigidly united at their centers by the dash-rods $h$.

Near the corner of each piece $g$ is cut a diagonal groove, $i$, down the edge, and the grooves opposite each other extend in opposite directions, so that as the dashers are worked up and down the cream will be thrown in opposite directions. As the cream is thrown in opposite directions on all sides, and as the dashers alternately rise and fall, the cream is forced back and forth through the holes in the partition with great force. The cream being thus broken by being thrown in all directions, as well as being forced back and forth through the holes, the butter is quickly formed, and at the expense of very little effort.

The mechanism for operating the dashers consists of a drive-wheel, $l$, which operates a pinion, $n$, on each side, and each pinion operates a shaft having a crank, $o$, on its end, which cranks are connected to the dash-rods $h$ by the pitmen $q$.

One or both of the pinions $n$ mesh with a small wheel, $r$, placed on a fan-shaft just below, so that when the drive-wheel $l$ is operated by means of its handle $s$, and the two dashers are being churned up and down, the fan $t$ will force a constant current of air down upon the cream.

The pinions $n$ $n$ are of different diameter, so as to give a constant change of stroke of the dashers, so that while at one instant the strokes are directly opposite, at the next they work together, thus giving a greater motion to the cream, and causing it to pass through the openings of the partition $c$ with greater force.

Having thus described my invention, I claim—

1. In a churn having two vertically-reciprocating dashers, the mechanism for operating the same, consisting, essentially, of the drive-wheel $l$, pinions $n$ $n$, of unequal diameter, cranks $o$ $o$, and pitmen $q$ $q$, whereby a constant change of stroke is obtained, substantially as and for the purposes herein set forth.

2. The combination of the box $a$, partition $c$, having angular and circular perforations $d$ $e$, the reversely-grooved dashers $g$, with rods $h$, and a mechanism, substantially as herein described, whereby a constant change of stroke is obtained, substantially as and for the purposes herein set forth.

In testimony that I claim the foregoing I have hereunto set my hand and seal this 23d day of August, 1878.

J. W. ROGERS. [L. S.]

Witnesses:
M. Q. BRETCHE,
JOHN LONG.